United States Patent
Weisenborn et al.

[15] 3,682,981
[45] Aug. 8, 1972

[54] 2-AMINO-2-(1,4-CYCLOHEXADIENYL) ACETIC ACID

[72] Inventors: Frank Lee Weisenborn, Somerset; Joseph Edward Dolfini, North Brunswick; Georges Gustav Bach, Hightstown; Jack Bernstein, New Brunswick, all of N.J.

[73] Assignee: E. R. Squibb & Sons, Inc., New York, N.Y.

[22] Filed: July 7, 1969

[21] Appl. No.: 839,633

Related U.S. Application Data

[62] Division of Ser. No. 741,852, July 2, 1968, Pat. No. 3,485,819.

[52] U.S. Cl............260/396 N, 260/349, 260/471 A, 260/501.11, 260/518 R, 260/544 M, 260/546
[51] Int. Cl..............................................C07c 101/28
[58] Field of Search...................260/468, 514, 396 N

[56] References Cited

OTHER PUBLICATIONS

Shoulders et al., J.A.C.S. 90, 2992 (1968)
Snow et al., J. Org. Chem. 33, 1774, (1968)
Jandacek, Ph.D. Thesis, 1968, abstract only
Dane et al., Angew Chem. Inter. Ed. 1, p. 658 (1962)

*Primary Examiner*—Lorraine A. Weinberger
*Assistant Examiner*—Robert Gerstl
*Attorney*—Lawrence S. Levinson, Merle J. Smith and Donald J. Perrella

[57] ABSTRACT

2-Amino-2-(1,4-cyclohexadienyl)acetic acid is a new intermediate which joins to 6-aminopenicillanic acid or 7-aminocephalosporanic acid to yield, respectively, α-amino-(1,4-cyclohexadienyl)methyl-penicillin or 7-[2-amino-2-(1,4-cyclohexadienyl)acetamido]-cepnalosporanic acid which are antibacterial agents.

3 Claims, No Drawings

2-AMINO-2-(1,4-CYCLOHEXADIENYL) ACETIC ACID

This application is a division of application Ser. No. 741,852, filed July 2, 1968 now U.S. Pat. No. 3,485,819.

SUMMARY OF THE INVENTION

This invention relates to α-amino-cyclohexadienylalkylene-penicillins and cephalosporins of the formula (I)
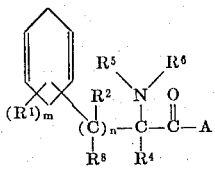

and to salts thereof.

A represents the 6-aminopenicillanic acid (6-APA) moiety, i.e., (II)
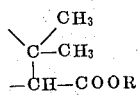

wherein R is hydrogen, lower alkyl or a salt forming ion, e.g., an alkali metal as sodium or potassium, an alkaline earth metal like calcium or magnesium, or that of an organic base like dibenzylamine, N,N-dibenzylethylenediamine or the like.

A also represents the 7-aminocephalosporanic (7-ACA) acid moiety, i.e., (III)
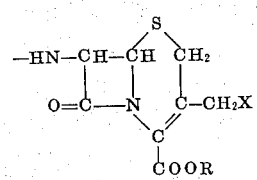

wherein R has the same meaning as above and X is hydrogen, lower alkanoyloxy, e.g., acetoxy, propanoloxy or the like, the radical of a nitrogen base such as methylamino, dimethylamino or the like, or a quaternary ammonium radical like 1-pyridinium. In addition X and R may represent a bond linking carbon and oxygen in a lactone ring.

$R^1$ represents hydrogen, lower alkyl or lower alkoxy, $R^2$, $R^3$, $R^4$, $R^5$ and $R^6$ each represents hydrogen or lower alkyl.

m represents 1 or 2.

n represents 0, 1, 2, 3 or 4.

The lower alkyl and lower alkoxy groups in the above formulas include straight and branched chain radicals such as methyl, ethyl, propyl, isopropyl, butyl, isobutyl, t-butyl, amyl, methoxy, ethoxy, propoxy, isopropoxy and the like.

Except where otherwise indicated, the symbols in the foregoing formulas and those which follow all have the meaning defined above.

The new compounds of formula I may be prepared by coupling an activated form of a cyclohexadienyl-α-aminoalkanoic acid, having the formula (IV)
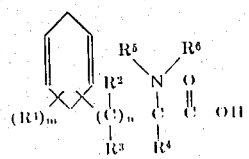

with the 6-APA moiety of formula II or 7-ACA moiety of formula III.

If one or both of $R^5$ and $R^6$ is hydrogen, the amino group is best protected before coupling for an efficient process. Protecting groups which may be used to protect the amino group during the reaction of the acid compound with the 6-APA or 7-ACA compound include, for example, triphenylmethyl, t-butoxycarbonyl, β,β,β-trichloroethoxycarbonyl,4-oxo-2-pentenyl-2, 1-carbomethoxy-1-propenyl-2 or the like. These are formed by reacting the acid of formula IV, wherein one or both of $R^5$ and $R^6$ are hydrogen, with a compound such as triphenylmethylchloride, t-butyl azidoformate, β,β,β-trichloroethyl chloroformate, acethylacetone, methylacetoacetate or the like. After the coupling reaction, the protecting group is removed, e.g., by treatment with aqueous acetic acid, trifluoroacetic acid, zinc-acetic acid, or aqueous mineral acid, respectively to give the compound with the free or monosubstituted amino group.

Alternately the amino group may be protected by protonation as the salt form before and during the subsequent coupling reaction.

In those cases in which both $R^5$ and $R^6$ represent lower alkyl, no protection of the amino group is necessary.

The coupling is preferably effected by conversion of the acid to an activated form such as the acid chloride, azide, p-nitrophenyl ester or mixed anhydride, or by condensing in the presence of a carbodiimide such as dicyclohexylcarbodiimide.

The starting materials of formula IV may be prepared by reducing a compound of the formula (V)
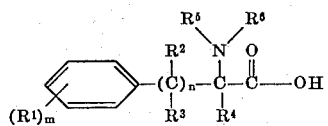

or a metal salt thereof, e.g., alkali metal salt, alkaline earth metal salt or the like, with sodium or lithium in liquid ammonia followed by treatment with an alcohol such as ethanol, t-butanol, followed by treatment with ammonium chloride, or other amine hydrochloride.

The products of this invention form salts which are also part of the invention. Basic salts form with the acid moiety as discussed above in connection with the symbol R. Acid addition salts also form with the α-amino nitrogen. Such acid salts include, for example, inorganic salts such as hydrohalides, e.g., hydrobromide, hydrochloride, hydroiodide, sulfate, nitrate, phosphate, borate, etc., and organic salts such as acetate, oxalate, tartrate, malate, citrate, succinate, benzoate, ascorbate, methanesulfonate and the like. It is frequently convenient to isolate and purify the product by forming a soluble or insoluble salt, as desired, then regenerating the free compound, by neutralization, for example.

Preferred compounds within the group described by formula I have the formula (VI)
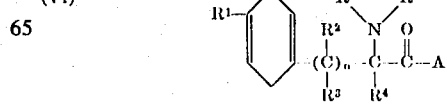

especially when $R^1$ is hydrogen or lower alkoxy (preferably methoxy) and $R^2$ to $R^6$ inclusive are all hydrogen and $n$ is 0, 1, or 2, especially $n$ is 0 or 1. In the most preferred embodiment A is the 6-aminopenicillanic acid moiety of formula II and $n$ is 0, especially when all R's represent hydrogen.

It will be appreciated that certain of the compounds of this invention exist in different optically active forms. The various stereoisomeric forms as well as the racemic mixtures are within the scope of this invention.

Ordinarily the new penicillin compound derived by coupling 6-APA with a series of D-α-aminocyclohexadienalkylene carboxylic acids are of highest potency. The configuration of the α-carbon of the aminoalkanoic acid used in the synthesis is retained in the product.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to penicillin G and other penicillins and cephalosporins. For example, a compound of formula I or a physiologically acceptable salt thereof may be used in various animal species in an amount of about 0.1 to 100 mg/kg daily, orally or parenterally, in single or two to four divided doses to treat infections of bacterial origin. By way of illustration the $PD_{50}$ orally in mice in a single administration is 1.3 mg/kg against *Streptococcus*, 8.6 mg/kg against *Proteus* and 11.8 mg/kg against *Salmonella*, respectively. Up to about 600 mg. of a compound of formula I or a salt thereof may be incorporated in an oral dosage form such as tablets, capsules or elixirs or in an injectable form in a sterile aqueous vehicle prepared according to conventional pharmaceutical practice. In cleaning or disinfecting compositions, e.g., in barns or dairy equipment, a concentration of about 0.01 to 1 percent by weight of such compounds admixed with, suspended or dissolved in conventional inert dry or aqueous carriers for application by washing or spraying may be used.

The following examples are illustrative of the invention. All temperatures are on the centigrade scale.

GENERAL PROCEDURE 1. 1,4-cyclohexadienyl-α-aminoalkanoic acid

A solution of 72.7 mmole of α-amino aryl alkanoic acid in 900 ml distilled ammonia (which has been treated with 45 mg. lithium after distillation to destroy traces of moisture) is slowly diluted with 370 ml. dry t-butyl alcohol.

Over a period of 2 hours, 1.65 g. lithium (3.27 eq.) is added in small portions until a permanent blue color is obtained. The blue reaction mixture is then treated with 38 g. of triethylamine hydrochloride. The ammonia is allowed to evaporate at room temperature overnight and the residual solvent is evaporated at reduced pressure. The white residue is taken up in a small amount of methanol-water and added to 4 l. of cold 1:1 chloroform acetone to precipitate the crude product. After 20 minutes stirring the suspension is filtered and the white filter cake dried in vacuo; the filter cake is then pulverized and submitted once more to the precipitation process from 1:1 chloroform-acetone.

The crystalline product is obtained in high yield and purity but is slightly contaminated with lithium chloride, about 1 percent chlorine being found by typical analysis. The material may be used directly.

2. Methyl acetoacetate enamine of α-amino-ω-(1,4-cyclohexadienyl)alkanoic acid sodium salt 2.00 mmoles of 1,4-cyclohexadienyl-α-aminoalkanoic acid is dissolved by warming in a solution of 108 mg. of $NaOCH_3$ (2.00 mmoles) in 4.3 ml. reagent grade MeOH. 255 mg. (0.24 ml. − 2.20 mmoles) methyl acetoacetate is added and the mixture refluxed for 45 minutes. The MeOH is almost totally stripped off in vacuo. 5 ml. benzene is added and distilled off to a small residual volume. The addition and distillation of benzene is repeated to insure complete removal of the MeOH and water. The product crystallizes out overnight from a small residual volume of benzene; the amorphous powder obtained from benzene is quite satisfactory for further use.

3. α-amino-ω-(1,4-cyclohexadienyl)alkylpenicillin 358 mg. 6-aminopenicillanic acid (1.66 mmoles) are stirred well in 2.5 ml. water while 0.23 ml. triethylamine are gradually added with the pH kept under 8.0. Final pH is 7.4; 0.85 ml. acetone are added and the solution kept at −10° C.

1.66 mmoles of methyl acetoacetate enamine of α-amino-ω-(1,4-cyclohexadienyl)alkanoic acid, sodium salt are stirred in 4.25 ml. acetone at −20° C. A microdrop OF N-methylmorpholine is added followed by the slow addition of 198 mg. of ice cold ethyl chloroformate. Water, 0.43 ml., is added at this point and a turbid solution results. The reaction is stirred for 10 minutes at −20° C.

The turbid solution of mixed anhydride is then added to the 6-APA solution. A complete solution is observed. The solution is stirred for 30 minutes at −10° C. It is then raised to room temperature and acidified to pH 2.0 with diluted HCl and, with good stirring, the pH is kept at that level for 10 minutes.

The solution is then extracted with 5 ml. xylene. The aqueous layer is layered with 5 ml. methyl isobutyl ketone and the pH adjusted to 5.0 with 1 N NaOH and chilled overnight. The resulting crystals are filtered off, washed with water, and air dried; alternately, the aqueous layer may be lyophilized, and the product obtained as a mixture with salt may be used directly or purified by crystallization from aqueous alcohol.

4. 7-[α-Amino-ω-(1,4-cyclohexadienyl)alkanoylamido]cephalosporanic acid 452 mg. (1.66 mmole) of 7-aminocephalosporanic acid are substituted for the 6-aminopenicillanic acid in part 3 above.

5. 7-[α-amino-ω-(1,4-cyclohexadienyl)alkanoylamido]-3-(1-pyridiniummethyl)-3-cephem-4-carboxylate When a 0.1 molar solution of the 7-[α-amino-ω-(1,4-cyclohexadienyl)alkanoylamido]-cephalosporanic acid is treated with 0.5 mole pyridinium acetate at pH7 (the pH is adjusted to 7 with a few drops of aqueous pyridine solution) for several hours at room temperature, a rapid solvolysis occurs which can be followed by paper chromatography; when the disappearance of the starting material is complete, lyophilization provides good yields of the product as a fine, white powder.

6. 7-[α-amino-ω-(1,4-cyclohexadienyl)alkaloylamido)]-3-deacelylcephalosporanic acid, lactone A 0.1 molar solution of the 7-[α-amino-ω-(1,4-cyclohexadienyl)alkanoylamido]-cephalosporanic acid is acidified with dilute hydrochloric acid to pH 1–3 and maintained at that point until paper chromatography shows absence of starting material; lyophilization gives the product as a powder which may be further purified by crystallization from aqueous ethanol or acetonitrile.

7. α-(N,N-dialkylamino)-ω-(1,4-cyclohexadienyl)alkylpenicillin

A 0.1 molar solution or suspension of the α-(N,N-dialkyl-amino)-ω-(1,4-cyclohexadienyl)alkanoyl chloride hydrochloride in chloroform (purified by distillation from $P_2O_5$) is added at 0° C. to a prepared 0.1 M solution of 6-aminopenicillanic acid which is obtained by adding three equivalents of triethylamine to a suspension of one equivalent of 6-APA at room temperature, and stirring for 1.5 hours. After the reaction mixture is stirred for 1 hour at 0° C., it is stripped at reduced pressure. The residue is triturated with an equal volume of water, the final pH being adjusted to 5 and the crude product filtered off. Recrystallization from water gives a pure product.

EXAMPLE 1 a. D-2-Amino-2-(1,4-cyclohexadienyl)acetic acid

A solution of 11.0 g. (72.7 mmole) of D-phenylglycine in 900 ml. distilled ammonia (which has been treated with 45 mg. lithium after distillation to destroy traces of moisture) is slowly diluted with 370 ml. dry t-butyl alcohol.

Over a period of 2 hours, 1.65 g. lithium (3.27 eq.) is added in small portions until a permanent blue color is obtained. The blue reaction mixture is then treated with 38 g. of triethylamine hydrochloride. The ammonia is allowed to evaporate at room temperature overnight and the residual solvent is evaporated at reduced pressure. The white residue is taken up in a small amount of methanol-water and added to 4 l. of cold 1:1 chloroform acetone to precipitate the crude product. After 20 minutes stirring the suspension is filtered and the white filter cake dried in vacuo; the filter cake is then pulverized and submitted once more to the precipitation process from 1:1 chloroform-acetone.

The white, crystalline product, 11.8 g., m.p. 297° (d), $[\alpha]_D$-89.7° (2 N NaOH) is quantitatively obtained but is slightly contaminated with lithium chloride, 0.6 percent ionic chlorine being found by analysis.

Analysis (corrected for LiCl content):

| Calcd: | C, 62.72; | H, 7.24; | N, 9.14 |
|---|---|---|---|
| Found: | C, 62.80; | H, 7.16; | N, 9.18 |

The n.m.r. spectrum shows absorptions at τ4.17 (vinyl), 6.21

7.30 (allylic) in the ratio of 3:1:4.

b. Methyl acetoacetic ester enamine of N-2-amino-2-(1,4-cyclohexadienyl)acetic acid sodium salt 306 mg. D-2-amino-2-(1,4-cyclohexadienyl)acetic acid (2.00 mmoles) are dissolved by warming in a solution of 108 mg. of $NaOCH_3$ (2.00 mmoles) in 4.3 ml. reagent grade MeOH. 255 mg. (0.24 ml. –2.20 mmoles) methyl acetoacetate are added and the mixture refluxed for 45 minutes. The MeOH is almost totally stripped off in vacuo. 5 ml. benzene are added and distilled off to a small residual volume. The addition and distillation of benzene is repeated to insure complete removal of the MeOH and water. The product crystallizes out overnight from a small residual volume of benzene. It is filtered off, washed with benzene, and dried in vacuo. Yield 463 mg.

c. D-α-Amino-(1,4-cyclohexadienyl)methylpenicillin 358 mg. of 6-aminopenicillanic acid (1.66 mmoles) are stirred well in 2.5 ml. of water while 0.23 ml. triethylamine are gradually added with the pH kept under 8.0. Final pH is 7.4; 0.85 ml. acetone are added and the solution kept at –10° C.

469 mg. methyl acetoacetate enamine of D-2-amino-2-(1,4-cyclohexadienyl)acetic acid sodium salt (1.715 mmoles) are stirred in 4.25 ml. acetone at –20° C. A microdrop of N-methylmorpholine is added followed by the slow addition of 198 mg. of ice cold ethyl chloroformate. Water, 0.43 ml., is added at this point and a turbid solution results. The reaction mixture is stirred for 10 minutes at –20° C.

The turbid solution of mixed anhydride is then added to the 6-APA solution. A complete solution is observed. The solution is stirred for 30 minutes at –10° C, then raised to room temperature, acidified to pH 2.0 with diluted HCl and, with good stirring, the pH is kept at that level for 10 minutes.

The solution is then extracted with 5 ml. xylene. The aqueous layer is layered with 5 ml. methyl isobutyl ketone and the pH adjusted to 5.0 with 1 N NaOH and chilled overnight. The resulting crystals are filtered off, washed with water and air dried. Yield, 272 mg. (44 percent), decomposes at 202° C.

Analysis: Calcd. for $C_{16}H_{21}N_3O_4S \cdot \frac{1}{2}H_2O$)

| | C. 53.31; | H, 6.15; | N, 11.66; | S, 8.89 |
|---|---|---|---|---|
| Found: | C, 53.50; | H, 6.32; | N 11.35; | S, 8.87 |

Iodometric penicillin titration = 97, 4 percent (titr. of anhydrous cpd. = 99.2 percent). N.M.R. τ4.3 (vinyl), 7.3 (allylic), 8.41, 8,48 (gem-dimethyl). Ratio: 3:4:6.

EXAMPLE 2 a. D-2-amino-3-(1,4-cyclohexadienyl)propionic acid 12.0 g. (72.7 mmole) of D-phenylalanine are substituted for the D-phenylglycine in the procedure of Example 1a. The D-2-amino-3-(1,4-cyclohexadienyl)propionic acid is obtained as a white powder.

b. Methyl acetoacetate ester enamine of D-2-amino-3-(1,4-cyclohexadienyl)propionic acid sodium salt This product is obtained by substituting 330 mg. of the product of part (a) above in the procedure of Example 1b.

c. D-α-amino-α-(1,4-cylohexadienyl)-ethylpenicillin 493 mg. of methyl acetoacetate enamine of D-2-amino-3-(1,4-cyclohexadienyl)propionic acid sodium salt (1.715 mmole) are substituted for the methyl acetoacetate enamine of D-2-amino-2-(1,4-cyclohexadienyl) acetic acid sodium salt in the procedure of Example 1c.

The mixed anhydride is added to the 6-APA, stirred for 30 minutes at −10° C., brought to room temperature, acidified to pH 2.0 as in Example 1c. The solution is then extracted with 5 ml. of xylene. The aqueous layer is layered with 5 ml. of methyl isobutyl ketone and the pH is adjusted to 5.0 with 1 N NaOH. The aqueous layer is then lyophilized to give the product directly, containing some sodium chloride.

EXAMPLE 3 a. D-2-amino-3-(4-methoxy-1,4-cyclohexadienyl)propionic acid

By substituting 14.2 g. (72.7 mmole) of D-0-methyltyrosine for the phenyl glycine in the procedure of Example 1a, D-2-amino-3-(4-methoxy-1,4-cyclohexadienyl)propionic acid is obtained as a white crystalline product, m.p. 227° C., $[\alpha]_D^{20}$ −50.2°.

Analysis

| | | | |
|---|---|---|---|
| Calcd.: | C, 60.89; | H, 7.67; | N, 7.10 |
| Found: | C, 60.81; | H, 7.45; | N, 7.13 | b. Methyl acetoacetic acid ester enamine of D-2-amino-3-(4-methoxy-1,4-cyclohexadienyl)propionic acid sodium salt This product is obtained by substituting 390 mg. of D-2-amino-3-(4-methoxy-1,4-cylohexadienyl)propionic acid (2.00 mmole) in the procedure of Example 1b.

c. D-α-amino-β-(4-methoxy-1,4-cyclohexadienyl)ethyl penicillin

By substituting 543 mg. (1.71 mmole) of the product of part (b) in the procedure of Example 1c, the above penicillin is obtained.

EXAMPLE 4

7-[D-2-amino-2-(1,4-cyclohexadienyl)acetamido]cephalosporanic acid

By substituting 452 mg. (1.66 mmole) of 7-aminocephalo-sporanic acid for the 6-APA in part (c) and otherwise following the procedure of Example 1, 7-[D-2-amino-2-(1,4-cyclohexadienyl)acetamido]cephalosporanic acid is obtained.

EXAMPLE 5

7-[D-2-amino-2-(1,4-cyclohexadienyl)acetamido]-3-deacetoxycephalosporanic acid

By substituting 356 mg. (1.66 mmole) of 3-deacetoxy-7-aminocephalosporanic acid for the 6-APA in part (c) and otherwise following the procedure of Example 1, the above product is obtained.

EXAMPLE 6

7-[D-2-amino-3-(1,4-cyclohexadienyl)propionamido]cephalosporanic acid

By utilizing the procedure of Example 2, but substituting 452 mg. of 7-aminocephalosporanic acid instead of 6-APA, the above product is obtained.

EXAMPLE 7

7-[D-2-amino-3-(1,4-cyclohexadienyl)-propionamido]-3-deacetoxycephalosporanic acid By utilizing the procedure of Example 2, but substituting 356 mg. of 3-deacetoxy-7-aminocephalosporanic acid for the 6-APA, the above product is obtained.

EXAMPLE 8

7-[D-2-amino-3-(4-methoxy-1,4-cyclohexadienyl)propionamido]-cephalosporanic acid By utilizing 544 mg. of methyl acetoacetate ester enamine of D-2-amino-3-(4-methoxy-1,4-cyclohexadienyl)propionic acid sodium salt of Example 3 and 7-aminocephalosporanic acid as in Example 4, the above product is obtained.

EXAMPLE 9

7-[D-2-amino-3-(4-methoxy-1,4-cyclohexadienyl)propionamido]-3-deacetoxycephalosporanic acid By utilizing 544 mg. of methyl acetoacetate enamine of D-2-amino-3-(4-methoxy-1,4-cyclohexadienyl)propionic acid sodium salt of Example 3 and 3-deacetoxy-7-aminocephalosporanic acid, as in Example 4, the above product is obtained.

EXAMPLE 10

7-[2-amino-2-(1,4-cyclohexadienyl)acetamido]-3-(1-pyridiniummethyl)-3-cephem-4-carboxylate This compound is obtained as the acetate by utilizing part 5 of the general procedure employing 7-[2-amino-2-(1,4-cyclohexadienyl)acetamido]cephalosporanic acid.

EXAMPLE 11

7-[2-amino-3-(1,4-cyclohexadienyl)propionamido]-3-(1-pyridiniummethyl)-3-cephem-4-carboxylate This compound is obtained as the acetate by utilizing part 5 of the general procedure employing 7-[2-amino-3-(1,4-cyclohexadienyl)propionamido]cephalosporanic acid.

EXAMPLE 12

7-[2-amino-3-(4-methoxy-1,4-cyclohexadienyl)propionamido]-3-(1-pyridiniummethyl)-3-cephem-4-carboxylate This compound is obtained as the acetate by utilizing part 5 of the general procedure employing 7-[2-amino-3-(4-methoxy-1,4-cyclohexadienyl)propionamido]cephalosporanic acid.

EXAMPLE 13

7-[2-amino-2-(1,4-cyclohexadienyl)-acetamido]-3-deacetylcephalosporanic acid lactone The use of 7-[2-amino-2-(1,4-cyclohexadienyl)acetamido]-cephalosporanic acid as the substrate in part 6 of the general procedure gives the lactone as the hydrochloride.

EXAMPLE 14

7-[2-amino-3-(1,4-cyclohexadienyl)propionamido]-3-deacetylcephalosporanic acid lactone The use of 7-[2-amino-3-(1,4-cyclohexadienyl)propionamido]cephalosporanic acid as the substrate in part 6 of the general procedure gives the lactone as the hydrochloride.

EXAMPLE 15

DL-α-amino-(4-methoxy-1,4-cyclohexadienyl)methylpenicillin

By substituting DL-4-methoxyphenyl glycine for the phenyl glycine in part a and otherwise following the procedure of Example 1, the above product is obtained.

EXAMPLE 16

7[DL-2-amino-2-(4-methoxy-1,4-cyclohexadienyl)acetamido]-cephalosporanic acid

By making the substitution of DL-4-methoxyphenyl glycine as in Example 15 and further substituting 7-aminocephalosporanic for the 6-aminopenicillanic acid in part c of Example 1, the above product is obtained.

EXAMPLE 17

DL-α-(N-methylamino)-(1,4-cyclohexadienyl)methyl penicillin

By substituting N-methyl-DL-phenylglycine for the D-phenyl glycine in part a and otherwise following the procedure of Example 1, the above product is obtained.

EXAMPLE 18

DL-α-(N,N-dimethylamino)-(1,4-cyclohexadienyl)acetic acid

Following the procedure of Example 1a, but substituting N,N-dimethyl-DL-phenyl glycine for O-phenyl glycine there is obtained the above compound.

EXAMPLE 19

DL-α-(N,N-dimethylamino)-(1,4-cyclohexadienyl)methyl penicillin

By substitution of DL-α-(N,N-dimethylamino)-(1,4-cyclohexadienyl)acetic acid (1.115 mmole) as the sodium salt for the methyl acetoacetate enamine of D-2-amino-2-(1,4-cyclohexadienyl)acetic acid, sodium salt in Example 1c, the above compound is obtained.

EXAMPLE 20

D-α-Amino-(1,4-cyclohexadienyl)methyl penicillin, sodium salt

One millimole of D-α-amino-(1,4-cyclohexadienyl)methyl penicillin is dissolved in 10 ml. of an 0.01 N aqueous sodium hydroxide solution. Lyophilization of the solution yields the desired sodium salt.

EXAMPLE 21

7-[D-2-amino-2-(1,4-cyclohexadienyl)acetamido]cephalosporanic acid, sodium salt

One millimole of 7-[D-2-amino-2-(1,4-cyclohexadienyl)-acetamido]cephalosporanic acid is dissolved in 10 ml. of an 0.10 N aqueous sodium hydroxide solution which is then lyophilized to produce the solid sodium salt.

What is claimed is:

1. 2-Amino-2-(1,4-cyclohexadienyl)acetic acid.
2. Acetoacetic ester enamine of N-2-amino-2-(1,4-cyclohexadienyl)acetic acid.
3. Methyl acetoacetic ester enamine of N-2-amino-2-(1,4-cyclohexadienyl)acetic acid sodium salt.

* * * * *

Disclaimer 3,682,981.—*Frank Lee Weisenborn*, Somerset, *Joseph Edward Dolfini*, North Brunswick, *Georges Gustav Bach*, Hightstown, and *Jack Bernstein*, New Brunswick, N.J. 2-AMINO-2-(1,4-CYCLOHEXADIENYL) ACETIC ACID. Patent dated Aug. 8, 1972. Disclaimer filed May 28, 1974, by the assignee, *E. R. Squibb & Sons, Inc.*

Hereby enters this disclaimer to claim 1 of said patent.

[*Official Gazette August 27, 1974.*]